Oct. 12, 1948.                T. U. SISSON                2,451,306
                  PICTURE FILM STRIP PROJECTION APPARATUS
Filed Dec. 29, 1945                              3 Sheets-Sheet 1

INVENTOR
THOMAS U. SISSON
BY
    Raymond F. Ternes
              ATTORNEY

Oct. 12, 1948.   T. U. SISSON   2,451,306
PICTURE FILM STRIP PROJECTION APPARATUS
Filed Dec. 29, 1945   3 Sheets-Sheet 2

INVENTOR
THOMAS U. SISSON
BY Raymond H. Ternes
ATTORNEY

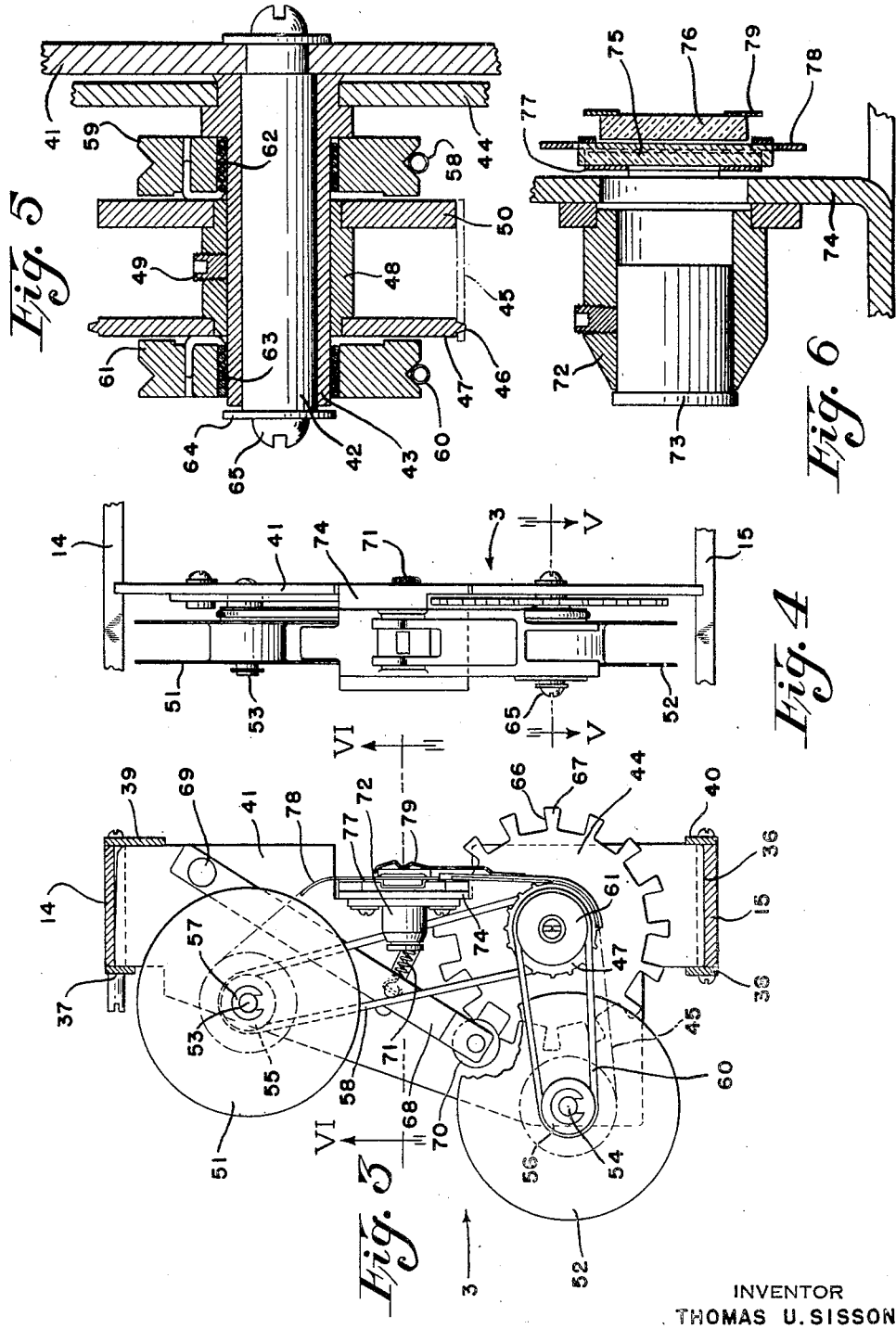

Patented Oct. 12, 1948

2,451,306

UNITED STATES PATENT OFFICE 2,451,306

PICTURE FILM STRIP PROJECTION APPARATUS

Thomas U. Sisson, Detroit, Mich., assignor to Training Devices, Inc., Detroit, Mich., a corporation of Michigan Application December 29, 1945, Serial No. 638,131

12 Claims. (Cl. 88—28)

This invention relates to a projection apparatus and, in particular, it relates to means for projecting images from strip photographic film in combination with a selective system whereby different reels of film may be readily positioned in alignment with a light source.

In projecting images from photographic film it is general practice to combine the film reels and associated projection means in a unitary assembly with a light source. In many cases, such as in educational or amusement devices where projection devices are required, it is desirable to provide a quick change from one film subject matter to another.

In accordance with the practice of my invention, I provide a single light source in cooperation with which a plurality of film units may be utilized. Each film unit comprises means for supporting reels for photographic film and a lens arrangement with which the film is adapted for association. Also included with each film unit is a cooperative indexing means for progressively moving the film in relation to the lens. This indexing means cooperates in combination with a single power driven operative means which is located in a fixed position and which engages with the film unit only when the film unit is positioned in alignment with the light source.

The apparatus includes a frame arrangement for supporting the film units. This entire frame arrangement is movable transversely of the path of the light beam in such a manner that any of a number of film units may be easily and quickly positioned in alignment with the light source whereby a particular subject may be projected.

It is, therefore, among the objects of my invention to provide a projection apparatus in which a multiplicity of different film subjects may be readily available for projection with a light source; to provide an apparatus in which a multiple number of film units may be utilized and in which each film unit may be easily and quickly removed or replaced from the apparatus; to provide a projection apparatus utilizing multiple film units in which a single power source for advancing the film is utilized; to provide a projection unit in which novel means are employed for progressively indexing film frames while maintaining a high degree of accuracy in the positioning of each film frame; and, to provide an apparatus of the character described which is efficient in design and economical of manufacture. These and other objects and advantages will appear more fully in the following detailed description when considered in connection with the accompanying drawings, in which:

Figure 3 is a view, in section, taken along lines III—III of Figure 1 and illustrating one of a plurality of film units;

Figure 4 is an end elevational view of the film unit illustrated in Figure 3;

Figure 5 is a view, in section, taken along lines V—V of Figure 4 illustrating a slip-clutch mechanism associated with the reel drives; and, Figure 6 is a transverse view, in section, of a lens mount taken along lines VI—VI of Figure 3.

Figure 1:
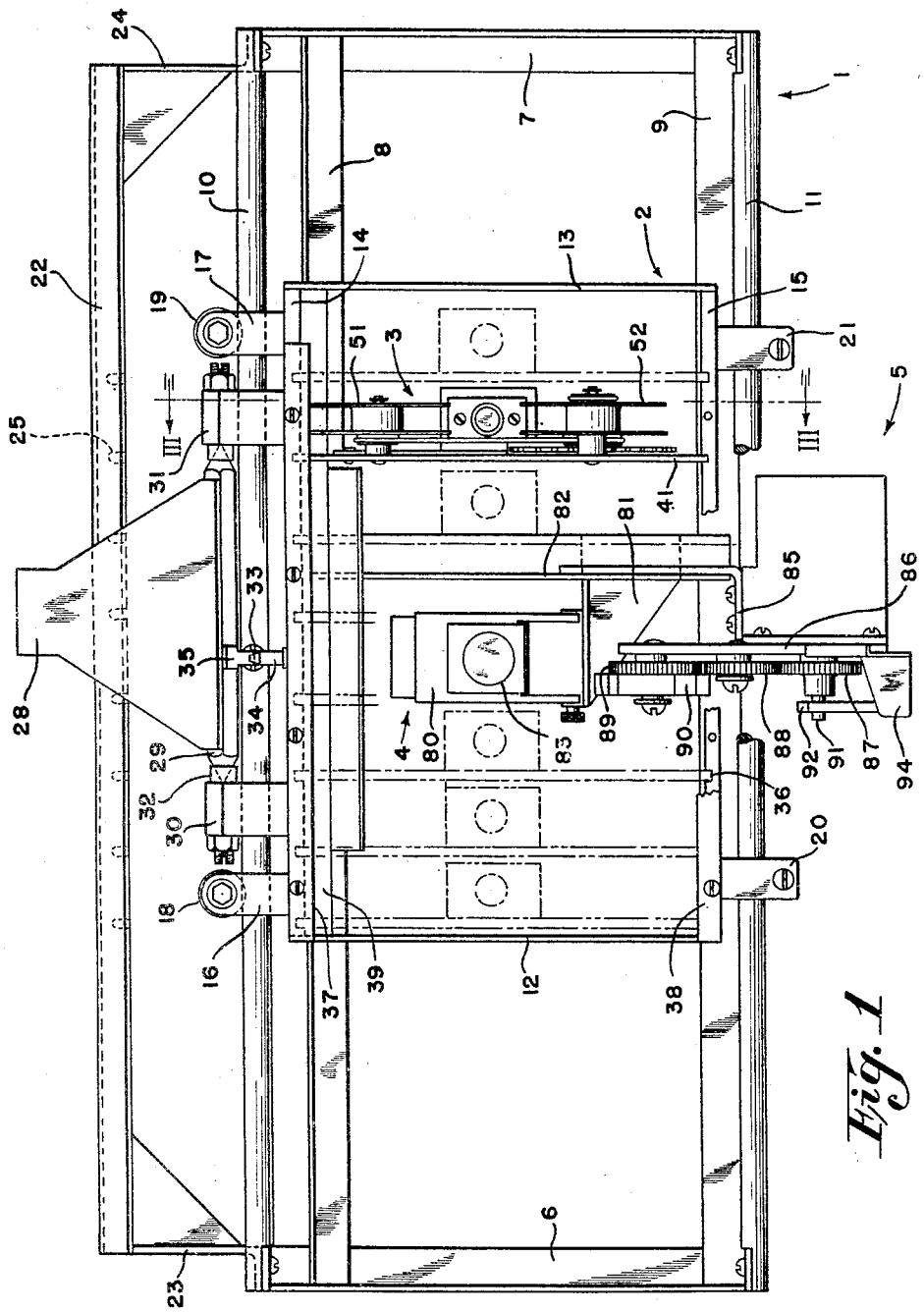
Figure 1 is a front elevational view of an assembly illustrating an embodiment of my invention.
Figure 2:
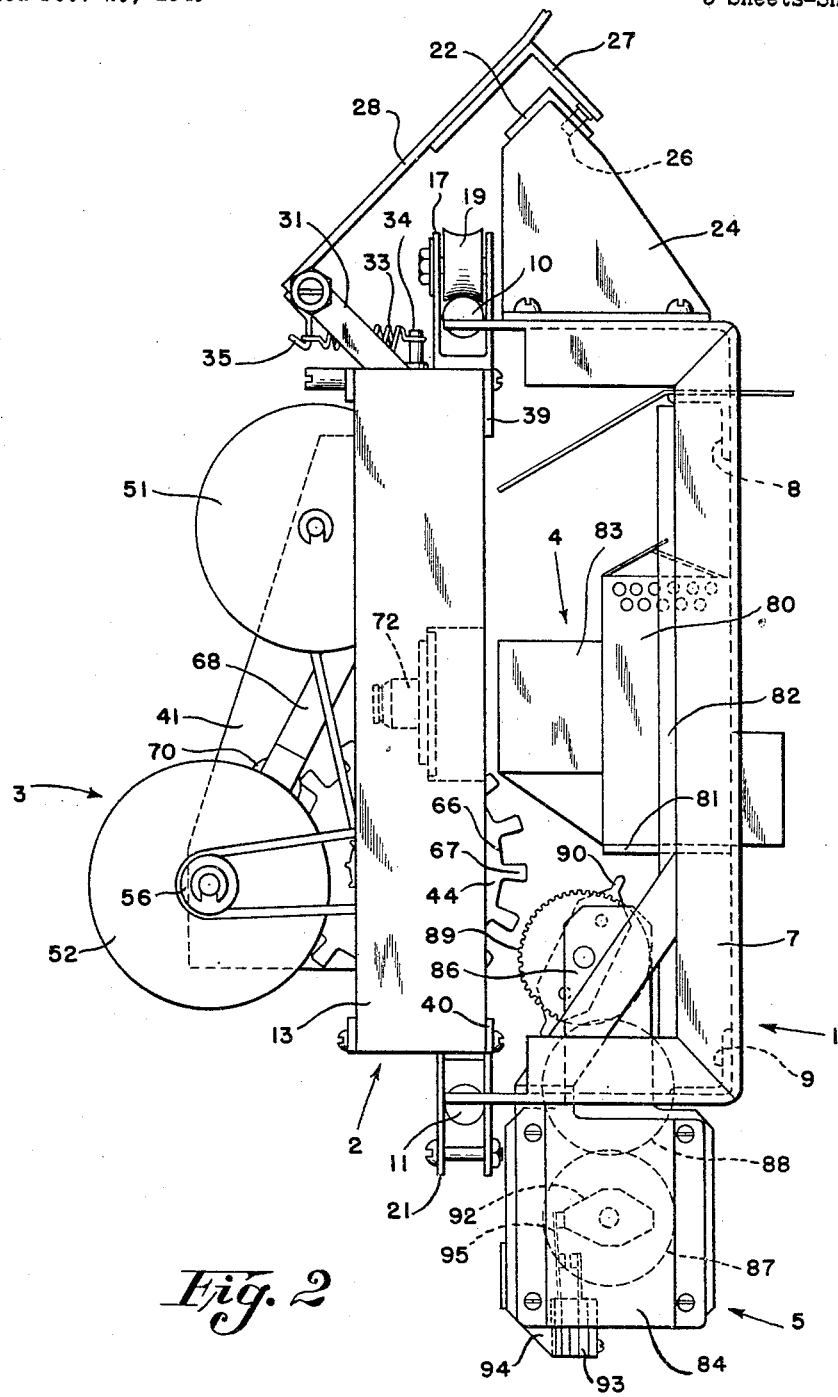
Figure 2 is a side elevational view thereof.

With reference to the drawings and in particular to Figures 1 and 2, I show an embodiment of my invention in the form of a projection apparatus comprising a plurality of units consisting essentially of a frame 1, a carriage 2, a film unit 3, a light source 4, and a drive unit 5. Each of these units cooperate with each other so as to permit the film units 3 to be moved selectively into registry with the frame 1 for the purpose of aligning the film unit with the light source 4 and the driving unit 5.

It is to be understood that an apparatus of this type is to be used primarily for still pictures in which moving picture film is to be utilized. While the present device is not limited to the size of film, the example, as shown in the drawings, is primarily designed for use with 16 mm. film. If desired, the entire frame and associated parts may be mounted in a cabinet, or other convenient support.

Essentially, the frame 1 includes vertical structural members 6 and 7, and horizontal members 8 and 9. An upper horizontal track rail 10 is attached to the frame 1 and functions as a support for the carriage unit 2. A lower horizontal guide-rail 11, also attached to the frame 1, functions to maintain the lower portion of the carriage 2 in a fixed path slidable in parallel relation with the track 10.

The carriage unit 2 which is supported by the track-rail 10 consists of a rectangular frame, comprises essentially vertical side plates 12 and 13 and upper and lower horizontal members 14 and 15, respectively. U-shaped brackets 16 and 17 are attached to the upper horizontal member 14 and support free rotatable wheels 18 and 19, respectively, for engaging with the track 10. By this arrangement, the carriage 2 hangs by gravity on the track 10 through the medium of the wheels 18 and 19, thus allowing the carriage 2 to be easily moved in a horizontal path along the length of the track 1.

Attached to the bottom frame member 15 of the carriage 2 are two U-shaped brackets 20 and 21 which straddle the lower guide rail 11. These brackets, in combination with the guide rail 11, prevent movement of the carriage 2 transversely of its normal path of travel.

In order to move the carriage unit 2 along its fixed path and to bring the film units 3 into proper registry with the light source 4 and the drive unit 5, I provide an indexing angle 22 supported from the frame 1 by means of brackets 23 and 24.

A plurality of slots 25 are formed in the indexing angle 22 in a fixed spaced relationship for the purpose of registering any desired film unit 3 in proper relation with the light source 4. A registering pin 26 is adapted for engaging the slot 25. This pin is supported by a bracket 27 attached to a plate 28 which, in turn, is secured to an axle 29 pivotally supported to the upper frame member 14 of the carriage 2 through brackets 30 and 31. The axle 29 is cone-shaped at its ends for pivotally engaging with sockets 32 adjustably attached to the brackets 30 and 31. By this pivotal mounting it is possible to adjust the film units 3 accurately in alignment with the light source 4. In order to maintain the registering pin 26 in tight engagement with the indexing slots 25, a tension spring 33 is supported by a post 34 attached to the frame member 14 and to a hook 35 attached to and extending from the axle 29. Thus, the pin 26 is normally retained in one of the slots 25 for purpose of proper registry of the film units 3.

The rectangular carriage unit 2 is adapted to support a plurality of film units 3. For this purpose the upper and lower horizontal members 14 and 15 are provided with a plurality of slots 36 extending transversely of the length of the members 14 and 15. These slots cooperate with the film unit 3 in such manner that it is merely necessary to slide the film units into place in the carriage or to remove them in the same manner. Retaining plates 37 and 38 are attached to the members 14 and 15, respectively, by means of machine screws for the purpose of holding the film units 3 securely in place after they have been positioned within the carriage. Back retaining plates 39 and 40 (Figure 2) function as confining means for closing the opposite ends of the slots 36 so as to secure the film units 3 within the carriage.

As shown in Figure 1, only one carriage unit 3 is illustrated and the remaining carriage units are indicated only by dot and dash lines. The units are illustrated in this manner since all of the carriage units are identical. While eight such film units are illustrated, it is to be understood that more or less units may be assembled, as described.

The film units 3 are illustrated in particular by Figures 3 and 4. Essentially, the entire unit is supported by a frame constituting a flat plate 41. This plate 41 is adapted to be received in the slots 36 in the upper and lower horizontal carriage members 14 and 15, respectively. Attached to the drive sleeve is a gear 44 which is driven from the drive unit 5 hereinafter described. The drive sleeve 41 operates to advance a length of strip film 45 in accordance with a predetermined distance fixed by the gear 44. The film 45 is of the perforated edge type adapted for engagement with teeth 46 on a film sprocket 47 attached to a hub 48 secured to the drive sleeve 43 by means of a set screw 49. A disc 50 serves to support the opposite edge of the film 45. It is to be understood, however, that teeth similar to 46 may be associated with the disc 50, is desired.

The drive shaft 43 also serves to drive upper and lower film reels 51 and 52, respectively. The film reels 51 and 52 are supported from the plate 41 by means of shafts 53 and 54 provided with pulleys 55 and 56, all respectively. Lock washers 57 retain the reels 51 and 52 in locked position on the shafts 53 and 54, respectively. The reel 51 is rotatable with the pulley 55 and is driven through a spring belt 58 from a pulley 59 mounted on a drive sleeve 43. Similarly, the reel 52, associated with the pulley 56, is driven by means of a spring belt 60 joining with a pulley 61 mounted on the drive sleeve 43. Helical springs 62 and 63 are positioned around the drive sleeve 43 between the sleeve and the pulleys 59 and 61, respectively, and are locked with the pulleys in such manner as to constitute an automatic clutch. By this arrangement, a constant tension is at all times maintained on the film 45 regardless of different drive speeds which may occur due to the building up of the convolutions of film on the reels 51 and 52. A washer 64 and attaching screw 65 limit the end movement of the drive sleeve 43 on the shaft 42.

The gear 44 is unconventional in design and consists of a disc in which slots 66 are cut so as to form teeth 67. The slots 66 are relatively wide and function to engage with a drive paddle hereinafter described.

In order to maintain the film 45 in proper registry, I provide means associated with the gear 44 for maintaining the gear and its associated film drive in fixed increment positions. This is accomplished by means of an arm 68 pivotally attached to the frame 41 at 69 and including a roller 70 supported at the opposite end of the arm 68. The roller 70 is adapted for engagement with the gear 44 in such manner that the roller, by means of a spring 71 attached to the arm 68, presses against the outer periphery of the gear 44 to constitute an indexing means by association with the slots 66. By such an arrangement, a uniform and accurate advancement of the film 45 is obtained.

The projection device associated with the film unit 3 comprises a lens bracket 72 (Figures 3 and 6) and a conventional lens assembly 73 supported from a bracket 74 forming an extension of the plate 41. The film 45, as it passes in alignment with the lens 73, extends between heat absorbing glass plates 75 and 76. The plate 75 is supported from the bracket 74 by a sheet metal support 77 to which is also attached a film guide 78. The plate 76 is supported by a spring bracket 79 which exerts a light pressure against the glass 76 and, in turn, against the film 45.

As thus described, it is noted that the film unit 3 is complete, including film reels, lens, drive and indexing means so as to constitute a completely independent mechanism for mechanically manipulating the film in proper index relation with a lens.

The light source with which the film units are positioned in alignment comprises a light unit 4, as shown in particular in Figure 2. This unit consists essentially of a housing 80 within which is mounted a conventional electric projection bulb. A bracket 81 supports the housing 80, and a vertical frame member 92 provides means for supporting the bracket 81 in relation to the main frame 1. A lens mount 83 connected to the housing 80 contains a conventional set of lenses with which the lens barrel 73 of the film unit is adapted for axial alignment.

The drive unit 5 comprises essentially a combination motor and reduction unit 84 secured to a bracket 85 attached to the main frame 1. At the front end of the motor 84 is a plate 86 for supporting a train of gears 87, 88 and 89. Attached to the gear 89 is a paddle wheel 90 adapted for engagement with the gear 44. The paddle wheel 90, in effect, constitutes a drive gear having two teeth, one of which is diametrically opposite to the other. Extending from the motor 84 is a drive shaft 91 to which is attached a cam 92. An electrical switch 93 is attached to the plate 86 through a bracket 94. The switch 93 is so positioned that a cam follower 95 associated with one of the arms of the switch 93 lies in the path of the cam 92. The switch 93 is normally in circuit making engagement. However, when the cam 92 contacts the cam follower 95 the switch circuit is broken. The purpose of this operation is to insure that the teeth of the paddle wheel 90 are out of the path of the gears 44 and thereby avoid any obstruction when the film units are selectively positioned in alignment with the light source 4. To accomplish this objective, the switch 93 is connected by conventional wiring to the motor in such a manner that the motor is cut off when the circuit of the switch 93 is broken. When it is desired to re-energize the motor, an additional circuit (not shown) is momentarily energized until the circuit produced by the switch 93 becomes closed due to movement of the cam 92 out of contact with the cam follower 95. The gears 87 and 89 are of the same diameter, thus the paddle wheel 90 assumes the same relative position as the cam 92.

As thus shown and described, it is believed apparant that I have provided a novel combination of film projection in which a multiplicity of different films may be readily and accurately positioned in alignment with a given light source and in which each film unit is cooperatively engageable with a drive source for advancing the film in accordance with predetermined time intervals.

While I have shown a preferred embodiment of my invention, it is to be understood that it is susceptible of those modifications which appear obviously within the spirit of the invention and the scope of the appended claims.

Having thus described my invention, what I claim and desire to protect by Letters Patent is:

1. A multiple projection apparatus comprising in combination, a frame, a directional light source in fixed relation with the frame, a plurality of projection units, each unit comprising spaced film reels and a lens assembly and indexing means for moving a length of film across the path of the lens, connections joining the film reels with the indexing means for imparting increments of rotary motion to said reels, a carriage for supporting the projection units, a track attached to the frame for supporting the carriage, and means for moving the carriage along the track transversely of the directional light source for selectively positioning the lens of one of the projection units in alignment with the light source.

2. A multiple projection apparatus comprising in combination, a frame, a directional light source in fixed relation with the frame, a plurality of projection units, each unit comprising spaced film reels and a lens assembly and indexing means for moving a length of film across the path of the lens, connections joining the film reels with the indexing means for imparting increments of rotary motion to said reels, a carriage for supporting the projection units, means for moving the carriage transversely of the directional light source for selectively positioning the lens of one of the projection units in alignment with the light source, and indexing means cooperatively positioned with the carriage and the frame for locking the carriage with the frame in the aligned positions.

3. A multiple projection apparatus comprising in combination, a frame, a directional light source in fixed relation with the frame, a plurality of projection units, each unit comprising spaced film reels and a lens assembly and indexing means for moving a length of film across the path of the lens, connections joining the film reels with the indexing means for imparting increments of rotary motion to said reels, a carriage for supporting the projection units, means for moving the carriage transversely of the directional light source for selectively positioning the lens of one of the projection units in alignment with the light source, a pivoted member associated with the carriage, indexing means associated with the frame, and means for urging the pivoted member into engagement with the indexing means for locking the carriage with the frame in the aligned positions.

4. A multiple projection apparatus comprising in combination, a frame, a plurality of projection units, each unit comprising spaced film reels and a lens assembly and indexing means for moving a length of film across the path of the lens, connections joining the film reels with the indexing means for imparting increments of rotary motion to said reels, a carriage for supporting the projection units, driving means supported by the frame and adapted to engage the indexing means, impellers associated with the driving means, means for moving the carriage for selectively positioning the indexing means of one of the projection units in alignment with the driving means, and means for normally maintaining the impellers of the driving means out of the path of travel of the carriage.

5. A multiple projection apparatus comprising in combination, a frame, a plurality of projection units, each unit comprising spaced film reels and a lens assembly and indexing means for moving a length of film across the path of the lens, connections joining the film reels with the indexing means for imparting increments of rotary motion to said reels, said indexing means consisting, in part, of a disc having slots in the outer periphery thereof and a film driving sprocket attached to the disc, a carriage for supporting the projection units, and a track attached to the frame for supporting the carriage, means associated with the frame for driving the slotted disc, said carriage being movable along the track for directly positioning the slotted disc of one of the projection units in complementary operating association with the driving means.

6. A multiple projection apparatus comprising in combination, a frame, a plurality of projection units, each unit comprising spaced film reels and a lens assembly and indexing means for moving a length of film across the path of the lens, connections joining the film reels with the indexing means for imparting increments of rotary motion to said reels, said indexing means consisting, in part, of a disc having slots in the outer periphery thereof, and a film driving sprocket attached to the disc, a carriage for supporting the projection units, a track attached to the frame for supporting the carriage, means associated with the frame for driving the slotted disc, said carriage being movable along the track for directly positioning the slotted disc of one of the projection units in complementary operating association with the driving means, and registering means cooperatively positioned with the carriage and the frame for locking the carriage with the frame in the aligned positions.

7. In a projection apparatus including a plurality of projection units adaptable for selective positioning with a light source, a projection unit comprising a plate, a drive shaft, a pair of film reels supported by the plate, connections joining the film reels with the drive shaft for rotating said film reels, a projection lens supported by the plate and lying in a film path between the reels, a film drive wheel mounted on the drive shaft, a film supported by the film reels, a disc attached to the drive shaft, uniformly spaced projections extending from the periphery of the disc, and a pressure wheel adapted to engage between the spaced projections for indexing the film in predetermined increments of movement.

8. In a projection apparatus including a plurality of projection units adapted for selective positioning with a light source, a projection unit comprising a plate, a drive shaft, a pair of film reels supported by the plate, connections joining the film reels with the drive shaft for rotating said film reels, a film drive wheel mounted on the drive shaft, a film supported by the film reels, a projection lens supported by the plate and lying in a film path between the reels, a carriage for supporting the projection units, a frame for supporting the carriage, and means for selectively positioning the carriage in relation with the frame.

9. In a projection apparatus including a plurality of projection units adapted for selective positioning with a light source, a projection unit comprising a plate, a drive shaft, a pair of film reels supported by the plate, connections joining the film reels with the drive shaft for rotating said film reels, a film drive wheel mounted on the drive shaft, a film supported by the film reels, a projection lens supported by the plate and lying in a film path between the reels, a carriage for supporting the projection units, and a frame for supporting the carriage, said carriage comprising horizontal upper and lower frame members having transverse slots therein for receiving and supporting the plate of said projection units.

10. In a projection apparatus including a plurality of projection units adapted for selective positioning with a light source, a projection unit comprising a plate, a drive shaft, a pair of film reels supported by the plate, connections joining the film reels with the drive shaft for rotating said film reels, a film drive wheel mounted on the drive shaft, a film supported by the film reels, a projection lens supported by the plate and lying in a film path between the reels, a carriage for supporting the projection units, a frame for supporting the carriage, said carriage comprising horizontal upper and lower frame members having transverse slots therein for receiving and supporting the plate of said projection units, and means for retaining the plate in said slots.

11. In a projection apparatus including a plurality of projection units adapted for selective positioning with a light source, a projection unit comprising a plate, a drive shaft, a pair of film reels supported by the plate, connections joining the film reels with the drive shaft for rotating said film reels, a film drive wheel mounted on the drive shaft, a film supported by the film reels, a projection lens supported by the plate and lying in a film path between the reels, a carriage for supporting the projection units, a frame for supporting the carriage, said carriage comprising horizontal upper and lower frame members having transverse slots therein for receiving and supporting the plate of said projection units, and means for selectively positioning the carriage in relation with the frame.

12. In a projection apparatus including a plurality of projection units adapted for selective positioning with a light source, a projection unit comprising a plate, a drive shaft, a pair of film reels supported by the plate, connections joining the film reels with the drive shaft for rotating said film reels, a film drive wheel mounted on the drive shaft, a film supported by the film reels, a projection lens supported by the plate and lying in a film path between the reels, a carriage for supporting the projection units, a frame for supporting the carriage, said carriage comprising horizontal upper and lower frame members having transverse slots therein for receiving and supporting the plate of said projection units, means for retaining the plate in said slots, and means for selectively positioning the carriage in relation with the frame.

THOMAS U. SISSON.

REFERENCES CITED

The following references are of record in the file of this patent:

UNITED STATES PATENTS

| Number | Name | Date |
|---|---|---|
| 2,180,638 | McMahon et al. | Nov. 21, 1939 |
| 2,206,134 | Streyckmaus | July 2, 1940 |
| 2,214,468 | Lannerd | Sept. 10, 1940 |
| 2,227,259 | Hokanson | Dec. 31, 1940 |
| 2,280,750 | Emerson | Apr. 21, 1942 |